United States Patent
Calandra, Jr. et al.

(10) Patent No.: US 6,619,888 B2
(45) Date of Patent: Sep. 16, 2003

(54) FLANGE NUT FOR MINE ROOF BOLT

(75) Inventors: Frank Calandra, Jr., Pittsburgh, PA (US); John C. Stankus, Canonsburg, PA (US); Michael Cokus, Sarver, PA (US); Steve Oyler, Carrolltown, PA (US); John G. Oldsen, Butler, PA (US)

(73) Assignee: Jennmar Corporation, Pittsburgh, PA (US)

(*) Notice: Subject to any disclaimer, the term of this patent is extended or adjusted under 35 U.S.C. 154(b) by 10 days.

(21) Appl. No.: 09/798,143

(22) Filed: Mar. 2, 2001

(65) Prior Publication Data

US 2001/0026746 A1 Oct. 4, 2001

Related U.S. Application Data

(60) Provisional application No. 60/186,309, filed on Mar. 2, 2000.

(51) Int. Cl.[7] .................... E21D 20/00; F16B 21/00
(52) U.S. Cl. .................... 405/259.6; 411/1; 411/310
(58) Field of Search .................... 411/1, 3, 5, 8, 411/308–311, 436; 405/259.6, 259.2, 259.5, 302.1

(56) References Cited

U.S. PATENT DOCUMENTS

| | | | | |
|---|---|---|---|---|
| 273,731 A | * | 3/1883 | Harvey | |
| 609,144 A | | 8/1898 | Goddin | |
| 991,016 A | | 5/1911 | Pearson | |
| 2,007,310 A | | 7/1935 | Sharp | 10/86 |
| 2,054,393 A | | 9/1936 | Sharp | 10/86 |
| 2,330,511 A | | 9/1943 | Money | 10/85 |
| 2,371,365 A | * | 3/1945 | Tomalis | |
| 2,688,355 A | | 9/1954 | Forster | 151/21 |
| 3,208,494 A | | 9/1965 | Skidmore | 151/21 |
| 3,352,342 A | | 11/1967 | Jacobson | 151/21 |
| 3,441,073 A | | 4/1969 | Johnson | 151/21 |
| 3,731,725 A | * | 5/1973 | Brophy | |
| 3,877,235 A | | 4/1975 | Hill | 61/45 B |
| 3,940,941 A | | 3/1976 | Libert et al. | 61/45 B |
| 3,971,085 A | | 7/1976 | Mount | 10/86 A |
| 3,979,918 A | | 9/1976 | Vidler | 61/45 B |
| 4,132,080 A | | 1/1979 | Hansen | 405/261 |
| 4,150,702 A | * | 4/1979 | Holmes | |
| 4,275,975 A | | 6/1981 | Morgan | 405/261 |
| 4,303,354 A | | 12/1981 | McDowell, Jr. | 405/261 |
| 4,607,984 A | | 8/1986 | Cassidy | 405/261 |
| 4,662,795 A | | 5/1987 | Clark et al. | 405/261 |
| 4,784,531 A | | 11/1988 | Calandra, Jr. | 405/261 |
| 5,282,698 A | | 2/1994 | Wright et al. | 405/259.6 |
| 5,326,208 A | | 7/1994 | Werner | 411/437 |
| 5,352,065 A | | 10/1994 | Arnall et al. | 405/259.2 |
| 5,417,520 A | | 5/1995 | Rastall | 405/259.6 |
| 5,791,849 A | * | 8/1998 | Goodwin | |
| 5,865,581 A | * | 2/1999 | Sadri | |
| 5,954,456 A | | 9/1999 | Bowles | 405/259.6 |

FOREIGN PATENT DOCUMENTS

| | | |
|---|---|---|
| DE | 19960768 | 7/2001 |
| FR | 1520975 | 3/1968 |
| SE | 0255308 | 7/1926 |

* cited by examiner

*Primary Examiner*—Flemming Saether
(74) *Attorney, Agent, or Firm*—Webb Ziesenheim Logsdon Orkin & Hanson, P.C.

(57) ABSTRACT

A method and apparatus for making a nut having a first end, a second end, and defining an orifice extending between the first end and the second end. A plurality of first threads are positioned in the orifice defined by the nut body, and a malformed thread is positioned in the orifice defined by the nut body, wherein the malformed thread interrupts continuity of at least one of the plurality of first threads.

14 Claims, 2 Drawing Sheets

FLANGE NUT FOR MINE ROOF BOLT

CROSS-REFERENCE TO RELATED APPLICATION

This application claims the benefit of earlier filed U.S. Provisional Patent Application Ser. No. 60/186,309, filed Mar. 2, 2000, and entitled "Improved Flange Nut."

BACKGROUND OF THE INVENTION

1. Field of the Invention

The present invention relates to threaded fasteners and, more particularly, to flange nuts used as mixing delay devices in mine roof bolt installations.

2. Description of the Prior Art

Mine roof bolts, bearing plates, and resin/catalyst cartridges are often used in mine roof support systems. In a general installation, the resin/catalyst cartridge is inserted into the bore hole, followed by a first end of the mine roof bolt. A second externally-threaded end of the mine roof bolt is generally positioned through an orifice defined by the mine roof plate. In tensionable mine roof bolts, a threaded nut is usually received on the second externally-threaded end of the mine roof bolt.

The mine roof bolt is then rotated, causing the resin/catalyst to mix and ultimately cure. If the threaded nut is permitted to advance toward the first end of the mine roof bolt during mixing, the mine roof bolt will not rotate properly, and the resin/catalyst will not mix. Therefore, it is advantageous to delay the advancement of the threaded nut until the resin has cured. Once cured, the resin prevents further rotation of the mine roof bolt, and the threaded nut may then be advanced toward the first end of the mine roof bolt, securely holding the bearing plate in place and allowing the cable bolt to be tensioned.

There are multiple prior art methods and structures which have sought to initially fix a threaded or non-threaded nut during rotation of the mine roof bolt. These methods include the use of delay mechanisms, such as shear pins or plaster thread inserts, as well as various nut thread arrangements.

For example, U.S. Pat. No. 3,979,918 to Vidler teaches deformations positioned adjacent to one end of an inner threading of a nut. These deformations allow the nut to cease rotating with respect to the mine roof bolt when the area of the deformations is reached. Continued rotation of the nut after the deformations are reached causes the entire mine roof bolt to rotate, mixing the resin/catalyst. Once the resin/catalyst hardens, continued rotation of the nut causes the mine roof bolt to defeat the deformations, allowing the nut to advance along a length of the mine roof bolt.

U.S. Pat. No. 5,282,698 to Wright et al. discloses a threaded fastener or nut with longitudinally-extending, V-shaped notches at an end of the nut. When the resin/catalyst has hardened and a mine roof bolt ceases to rotate, continued rotation of the nut pushes the V-shaped notches away from the mine roof bolt, allowing the nut to be further tightened.

U.S. Pat. No. 5,417,520 to Rastall discloses an internally-threaded nut with dimples stamped on a flat portion of an end of the nut to deform the internal threads. These dimpled areas allow the mine roof bolt and internally-threaded nut to be uniformly rotated until the resin/catalyst hardens. Once the resin/catalyst hardens, the dimples yield to the mine roof bolt, allowing the threaded nut to advance along a length of the mine roof bolt.

Finally, U.S. Pat. No. 5,954,456 to Bowles discloses an internally-threaded nut having an outwardly-extending end portion, which is coined to reduce the pitch of the threads at an end of the nut. As with the previously-discussed patents, this reduction in thread pitch near the end of the internally-threaded nut allows the internally-threaded nut to be rotated relative to the bolt until these lower-pitched threads are reached. After the lower-pitched threads are reached, the internally-threaded nut and mine roof bolt rotate together until the resin/catalyst hardens. At this point, further torque on the internally-threaded nut forces the nut along a length of the mine roof bolt, allowing the internally-threaded nut to be torqued.

There are several drawbacks of the prior art nut elements. Expensive tooling costs can be involved in pitch reduction, dimpling, creation of a dome structure, or creating other hard-to-machine deformations or indentations. It is also often necessary to control, within acceptable limits, the breakout torque for the nut, and the prior art methods have limitations on the breakout torque. Hence, a need remains for an improved flange nut which is easy to manufacture, has reduced machining costs, and can meet varying breakout requirements for the nut.

SUMMARY OF THE INVENTION

The present invention seeks to obviate the disadvantages of the prior art by providing a nut having a nut body, a first end, a second end, and defining an orifice extending between the first end and the second end. A plurality of first threads and a malformed thread are each positioned in the orifice defined byte nut body, wherein the malformed thread interrupts continuity of at least one of the plurality of first threads. More particularly, the plurality of first threads are positioned at a receiving end of the nut body in the orifice defined by the nut body. Each of the first threads have a uniform height, a uniform pitch, and form lead-in threads for the nut. The malformed thread positioned in the orifice defined by the nut body following the first threads has a thread height which is greater than or less than the uniform height of the plurality of first threads and a pitch, as measured from a neighboring one of the plurality of first threads, which is substantially equal to the uniform pitch of the first threads. The malformed thread interrupts continuity of at least one of the plurality of first threads for temporarily preventing the nut from being advanced along the externally threaded shaft, wherein at the application of a predetermined torque on the nut the malformed thread is tapped by the external threads of the shaft.

The nut body further defines an interior nut wall. The malformed thread may be an untapped portion of the interior nut wall, a partially tapped thread, a thread which has been stripped, or any thread having a thread height which is larger than a thread height of any one of the plurality of first threads.

In general, one method of producing a nut according to the present invention includes the steps of: (a) making a nut body having a first end and a second end; (b) defining an orifice in the nut body which extends between the first end and the second end; (c) positioning a plurality of first threads in the orifice defined by the nut body; and (d) interrupting the plurality of first threads with a malformed thread. The step of interrupting the plurality of first threads with a malformed thread may be accomplished by stripping one of the plurality of uniformly-pitched first threads, partially tapping the interior nut wall, not tapping a portion of the interior nut wall, or forming a thread having a thread height greater than the thread height of any one of the plurality of first threads.

In one exemplary application, a resin mixing delay system for mine roof support is also provided. The system generally includes a mine roof bolt having a first bolt end defining a plurality of external threads and a flange nut body. The flange nut body has a first end, a second end, and defines an orifice extending between the first end and the second end. A plurality of uniformly-pitched first threads are positioned in the orifice defined by the flange nut body, with each of the plurality of uniformly-pitched threads having a substantially equal thread height. At least one malformed thread positioned in the orifice defined by the body. The malformed thread has a thread height that is greater than or less than the thread height of any one of the plurality of uniformly-pitched threads.

In this example, the plurality of uniformly-pitched first threads receives the plurality of external threads defined by the first bolt end of the mine roof bolt. The mine roof bolt has a second bolt end and may further include a mechanical anchor positioned between the first bolt end and the second bolt end. The flange nut body may further define an enlarged cavity portion adjacent to the first end of the flange nut, a square-shaped drive head, and a flange.

It is, therefore, an object of the present invention to provide an improved flange nut which is easy to manufacture and requires low manufacturing costs. It is a further object of the present invention to provide a flange nut for torque tension applications where the breakout torque is tightly controlled.

The invention, both as to its construction and its method of operation, together with additional objects and advantages thereof, will best be understood from the following description of specific embodiments when read in connection with accompanying drawings.

BRIEF DESCRIPTION OF THE DRAWINGS

FIG. 3 is a cross-sectional side view of a nut according to a second embodiment of the present invention;

FIG. 4 is a cross-sectional side view of a nut according to a third embodiment of the present invention;

FIG. 5 is a cross-sectional side view of a nut according to a fourth embodiment of the present invention.

DETAILED DESCRIPTION OF THE PREFERRED EMBODIMENTS

Figure 1:
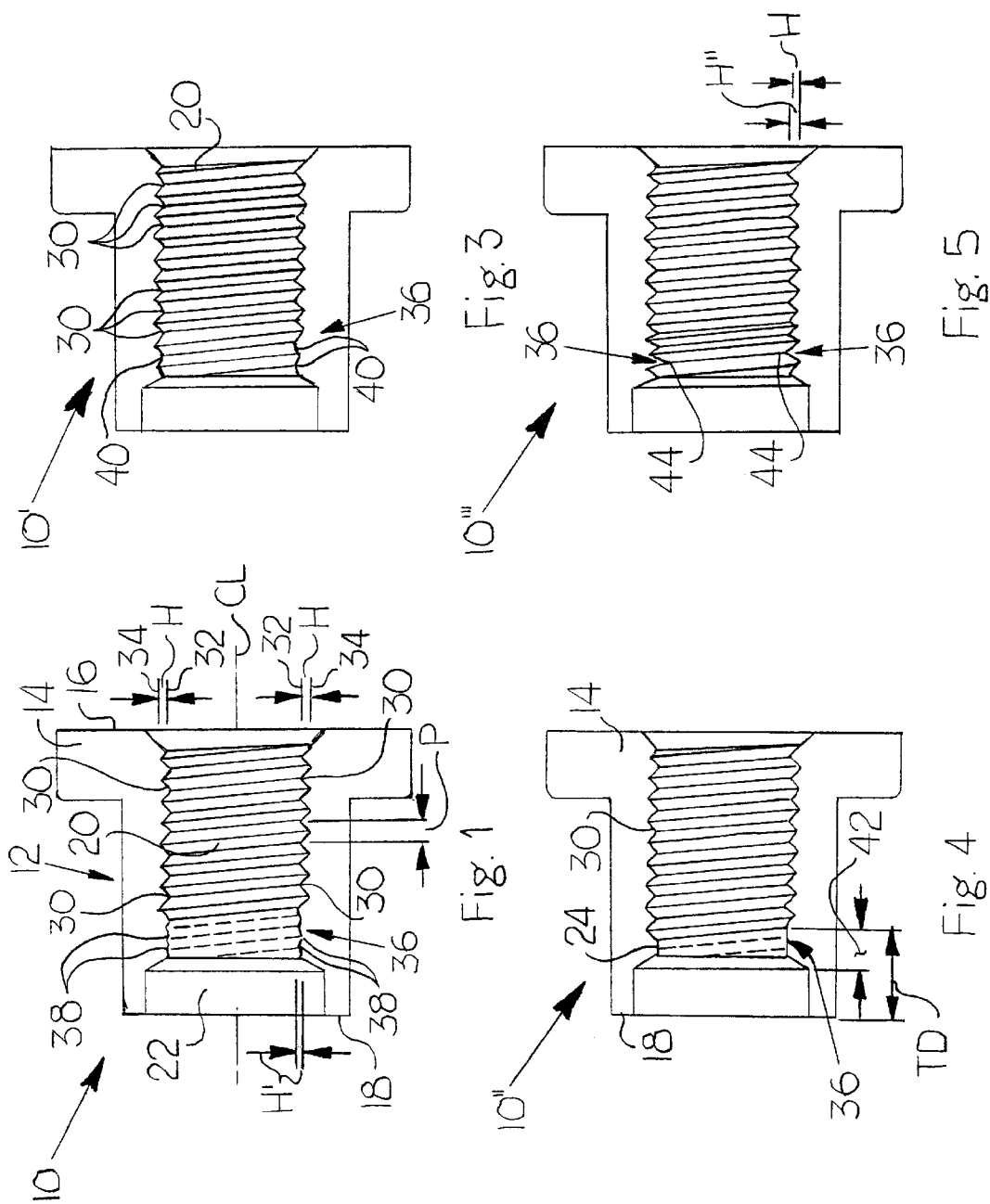
FIG. 1 is a cross-sectional side view of a nut according to one embodiment of the present invention.
Figure 2:
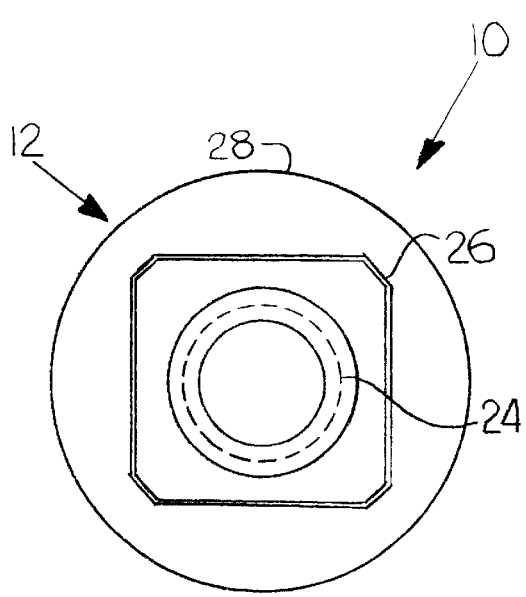
FIG. 2 is an end view of the nut shown in FIG. 1.

FIGS. 1 and 2 show a nut 10, such as a flange nut 12, according to a first embodiment of the present invention. As shown in FIG. 1, the nut 10 generally includes a nut body 14 having a first end 16, a second end 18, and defining an orifice 20 extending between the first end 16 and the second end 18 along an imaginary centerline CL. The nut body 14 may further define an enlarged orifice portion 22, which is in fluid connection with the orifice 20, and an internal nut wall 24, as shown in FIG. 2. While FIG. 2 shows a flange nut 12 having a square-shaped head 26 and a flange 28, other nut shapes are clearly contemplated.

As shown generally in FIG. 1, a plurality of first threads 30 of any suitable type are each positioned in the orifice 20 defined by the nut body 14. For purposes of this description, a first thread 30 is herein generally defined as a ridge, such as a continuous spiral shaped ridge, having an apex 32 and a nadir 34. More particularly, the apex 32 of each first thread 30 extends toward the imaginary centerline CL of the orifice 20 defined by the nut body 14. The plurality of first threads 30 are preferably formed by tapping the nut body 14 in a conventional manner.

With continuing reference to FIG. 1, the plurality of first threads 30 each preferably have a substantially uniform thread height H and two or more of the plurality of first threads 30 have a uniform pitch P. Thread height H is generally defined herein as a measured distance between an apex 32 of a first thread 30 and the corresponding nadir 34 of each first thread 30. Pitch P is generally defined herein as the spacing between apexes 32 of neighboring first threads 30.

At least one malformed thread 36 is also positioned in the orifice 20 defined by the nut body 14, wherein the malformed thread 36 interrupts continuity of at least one of the plurality of first threads 30. A thread height H' of the at least one malformed thread 36 may be greater than, less than, or equal to the thread height H of one or more of the plurality of first threads 30.

FIG. 1 shows a first embodiment of a nut 10 according to the present invention having a plurality of first threads 30 and at least one malformed thread 36 positioned in the orifice 20 defined by the nut body 14. In this embodiment, the first threads 30 and the at least one malformed thread 36 are continuous, and the malformed thread or threads 36 are only partially-formed threads 38, preferably formed by only partially tapping the nut body 14.

FIG. 3 shows a nut 10' according to a second embodiment of the present invention. In FIG. 3, the plurality of first threads 30 and at least one malformed thread 36 are each positioned in the orifice 20 defined by the nut 10', with the plurality of first threads 30 and the malformed threads 36 being continuous. However, in this second embodiment 10', the at least one malformed thread 36 is a thread, such as first thread 30 or some other type of threads, is a stripped thread 40. Stripping, which commonly occurs when a threaded nut is overtightened on a threaded bolt, may be done by coining or some other type of process.

FIG. 4 shows a third embodiment nut 10" according to the present invention. In this embodiment, the malformed thread 36 is an unthreaded portion 42 of the interior nut wall 24. In operation, when the nut 10" is threadedly attached to an externally-threaded bolt, the external threads defined by the bolt tap the unthreaded portion 42 of the interior nut wall 24.

Finally, a fourth embodiment nut 10''' according to the present invention is shown in FIG. 5. In this fourth embodiment, the malformed thread 36 has a thread height H'', which is greater than the thread height H any one of the plurality of first threads 30. In operation, this larger thread 44 is stripped by external threads of a bolt.

The plurality of first threads 30 may be used with any of the malformed threads 36 discussed above, or in any combination. However, it is desirable to threadingly engage any embodiment of the present invention with an externally-threaded end of a bolt, such as the mine roof bolt 46 shown in FIG. 6. Therefore, the plurality of first threads 30 are preferably positioned in the orifice 20, adjacent to the first end 16 of the nut 10, so as to engage the externally-threaded end 48 of the mine roof bolt 46 before the externally-threaded end 48 of the mine roof bolt 46 reaches the at least one malformed thread 36.

In general, one method of producing a nut 10 according to any of the embodiments of the present invention includes the step of making a nut body 14 having a first end 16 and a second end 18. The next preferred step is defining an orifice 20 in the nut body 14 which extends between the first end 16 and the second end 18. Other steps include positioning a plurality of first threads 30 in the orifice 20 defined by the nut body 14 and interrupting the plurality of first threads 30 with a malformed thread 36.

In order to control the breakout torque of a flange nut 12 in mine roof support applications, metallurgical properties and thread tapping should be controlled to achieve the combinations necessary to achieve the desired breakout torque. In mine roof support applications, delay mechanisms which create 90–120 foot pounds of breakout torque may be sufficient. However, with faster setting resins, spinners are now more frequently encountered. A spinner generally refers to a mine roof bolt that spins in the bore hole without sufficient engagement with the bore hole (i.e., it spins). Therefore, for a standard #6 rebar bolt with ¾" threads, a breakout torque on the order of 200 foot pounds or more may be required.

Adequate breakout torque may be achieved by constructing a nut from ASTM 536-84 specification steel. The preferred chemistry is a ductile iron having a weight percent composition of approximately 3.5–3.9% C; approximately 2.2–2.9% S; a maximum of approximately 0.80% Mn; a maximum of approximately 0.05% P; a maximum of approximately 0.02% S; approximately 0.025–0.075% Mg; 0.20–1.2% Cu; and the balance being iron and incidental impurities. The nuts 10 are then cast into appropriate shapes by molds, and the cooling of the parts is controlled in conjunction with the composition to give a desired hardness for the castings. A BHN hardness of 211 has been found satisfactory, whereas a BHN hardness of 249 has been found only partially acceptable.

In addition to controlling thread pitch P and height H, it has been found that it is important to control tap depth TD along centerline CL, as shown in FIG. 4. Tap depth TD is defined herein as the overall length of the tap between the last full thread of the plurality of first threads 30 and the second end 18 of the nut body 14. For example, for a mine roof bolt 46 made from #6 rebar having a ¾" external thread and a breakout torque of 200 foot pounds, it has been found that the tap depth TD should be 0.450 inches. As the tap depth TD increases, the breakout torque also increases.

While it is a mechanism which allows for the adjustment of breakout torque, it is recognized that the residual torque, that is, the torque to turn the nut 10 after breakout, may also be increased. Since it is desirable to keep the residual torque as low as possible, lubrication, such as by coating the externally-threaded end 48 of the mine roof bolt 46, can be utilized. Notching the externally-threaded end 48 of the mine roof bolt 46 is an additional mechanism for preventing deformation of the externally-threaded end 48.

Figure 6:
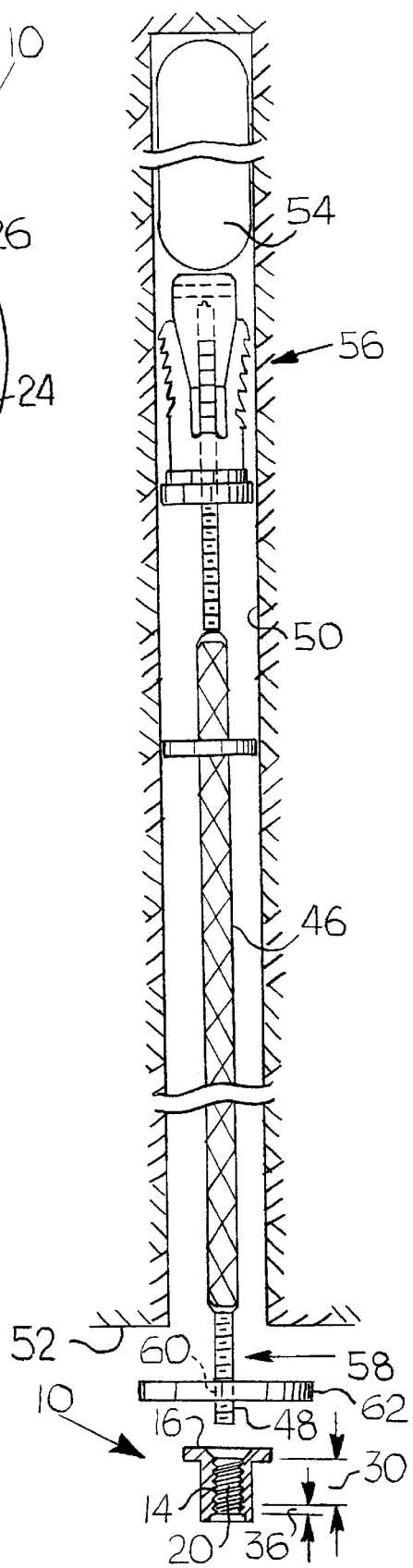
FIG. 6 is a side view of one type of mine roof support system having a mine roof bolt, a bearing plate, and the nut shown in FIGS. 1 and 2.

Installing a nut 10 according to the present invention in a mine roof support system is generally shown in FIG. 6. A bore hole 50 is created in earth and rock in a roof 52 of the mine. The bore hole 50 is particularly adapted to receiving a resin/catalyst 54 and a mine roof bolt 46. This resin/catalyst 54, usually a cartridge that includes both a resin/catalyst and adhesive, is inserted into the bore hole 50 defined by the mine roof 52, and, thereafter, a second end 56 of the mine roof bolt 46 is also inserted into the bore hole 50. A first end 58 of the mine roof bolt 46 is placed through an orifice 60 defined by a bearing plate 62. In practice, the nut 10 is preferably preassembled on a first end 58 of the mine roof bolt 46, all the way to the at least one malformed thread 36 positioned in the orifice 20 defined by the nut body 14.

The nut 10 is rotated, causing the mine roof bolt 46 to rotate in the bore hole 50 and then mix the resin/catalyst 54 to form an adhesive. As the adhesive cures, the rotation of the nut 10 and mine roof bolt 46 can no longer continue with the uniform torque previously applied.

As the nut 10 is rotated further around the now stationary mine roof bolt 46, the externally-threaded end 48 of the mine roof bolt 46 forms or reforms new threads in the orifice 20 defined by the nut body 14. The externally-threaded end 48 of the mine roof bolt 46 then continues through the newly-tapped or retapped malformed threads 36, allowing the nut 10 to advance along a length of the mine roof bolt 46. In this manner, the nut 10 can be further threaded snugly against the bearing plate 62 to tension the system against the mine roof 52.

The present invention is an economically-feasible nut with low-tooling costs. Further, the nut is easily manufactured, requires no additional tooling equipment and requires no additional appurtenances on the end of the nut. Since no shear pin or other external material is required as a delay mechanism, contamination with other mining equipment is avoided. Also, by coordinating the physical properties of the plurality of first threads and the external bolt threads with the thread dimensions and the tap depth, desired and reproducible breakout torques can be achieved.

The invention has been described with reference to the preferred embodiments. Obvious modifications and alterations will occur to others upon reading and understanding the preceding detailed description. It is intended that the invention be construed as including all such modifications and alterations insofar as they come within the scope of the appended claims or equivalents thereof.

We claim:

1. A nut configured to be threaded onto a shaft that defines external threads, the nut comprising:
   a nut body having a receiving end, a second end opposite the receiving end, and defining an orifice extending between the receiving end and the second end;
   a plurality of first threads positioned at the receiving end in the orifice defined by the nut body, each of the first threads having a uniform height and a uniform pitch and forming lead-in threads for the nut; and
   a malformed thread positioned in the orifice defined by the nut body following the first threads, the malformed thread having:
   a thread height which is greater than or less than the uniform height of the plurality of first threads; and
   a pitch, as measured from a neighboring one of the plurality of first threads, which is substantially equal to the uniform pitch of the first threads,
   wherein the malformed thread interrupts continuity of at least one of the plurality of first threads for temporarily preventing the nut from being advanced along the externally threaded shaft, wherein at the application of a predetermined torque on the nut the malformed thread is tapped by the external threads of the shaft.

2. The nut as claimed in claim 1, wherein the malformed thread is a partially-tapped thread.

3. The nut as claimed in claim 1, wherein the nut body further defines an interior nut wall, and the malformed thread is an untapped portion of the interior nut wall.

4. The nut as claimed in claim 1, wherein the malformed thread is a thread which has been stripped.

5. The nut as claimed in claim 4, wherein the thread which has been stripped is a first thread.

6. The nut as claimed in claim 1, wherein the nut is a flange nut.

7. A resin mixing delay system comprising:

a mine roof bolt having a first bolt end defining a plurality of external threads;

a flange nut body that is rotateably connected to one end of the mine roof bolt, the flange nut body having a receiving end for receiving the external threads of said bolt and a second end opposite the receiving end and defining an orifice extending between the receiving end and the second end;

a plurality of first threads positioned at the receiving end in the orifice defined by the flange nut body, the plurality of first threads each having a uniform height and a uniform pitch and forming lead-in threads for the flange nut body; and at least one malformed thread positioned in the orifice defined by the flange nut body following the first threads, the malformed tread having a height that is greater than or less than the uniform height of any one of the plurality of first threads, and a pitch, as measured from a neighboring one of the plurality of first threads, which is substantially equal to the uniform pitch of the first threads, wherein the malformed thread interrupts continuity of at least one of the plurality of first threads for temporarily preventing rotation of the flange nut body with respect to the mine roof bolt, wherein at the application of a predetermined torque on the flange nut body the malformed thread is tapped by the external threads of the mine roof bolt.

8. The resin mixing delay system as claimed in claim 7, wherein the mine roof bolt further comprises a second bolt end and a mechanical anchor positioned between the first bolt end and the second bolt end.

9. The resin mixing delay system as claimed in claim 7, wherein the malformed thread is a partially-tapped thread.

10. The resin mixing delay system as claimed in claim 7, wherein the flange nut body further defines an interior nut wall and the malformed thread is an untapped portion of the interior nut wall.

11. The resin mixing delay system as claimed in claim 7, wherein the malformed thread is any type of thread which has been stripped.

12. The resin mixing delay system as claimed in claim 7, wherein the flange nut body further defines an enlarged cavity portion adjacent to the first end of the flange nut and the flange nut further comprises a square-shaped drive head and a flange.

13. The resin mixing delay system as claimed in claim 7, further comprising a resin/catalyst cartridge which is punctured by the mine roof bolt.

14. The resin mixing delay system as claimed in claim 7, further comprising a bearing plate defining an orifice which receives the mine roof bolt.

* * * * *

UNITED STATES PATENT AND TRADEMARK OFFICE
CERTIFICATE OF CORRECTION

PATENT NO. : 6,619,888 B2
DATED : September 16, 2003
INVENTOR(S) : Frank Calandra Jr. et al.

It is certified that error appears in the above-identified patent and that said Letters Patent is hereby corrected as shown below:

Title page, Item [54] and Column 1, lines 1 and 2,
Title, "FLANGE NUT FOR MINE ROOF BOLT" should read
-- IMPROVED FLANGE NUT FOR MINE ROOF BOLT --.

Column 2,
Line 30, "byte" should read -- by the --.

Column 7,
Line 18, "tread" should read -- thread --.

Signed and Sealed this

Twenty-third Day of March, 2004

JON W. DUDAS
*Acting Director of the United States Patent and Trademark Office*